United States Patent [19]
Mumura

[11] Patent Number: 5,543,835
[45] Date of Patent: Aug. 6, 1996

[54] ELECTRONIC CAMERA FEATURING SINGLE IMAGE PROCESSING

[75] Inventor: Toshihiko Mumura, Yokohama, Japan

[73] Assignee: Canon Kabushiki Kaisha, Tokyo, Japan

[21] Appl. No.: 354,774

[22] Filed: Dec. 12, 1994

Related U.S. Application Data

[63] Continuation of Ser. No. 22,754, Feb. 19, 1993, abandoned, which is a continuation of Ser. No. 893,889, Jun. 4, 1992, abandoned, which is a continuation of Ser. No. 688,274, Apr. 22, 1991, abandoned.

[30] Foreign Application Priority Data

Apr. 23, 1990 [JP] Japan .................................. 2-108162

[51] Int. Cl.[6] .......................... H04N 5/225; H04N 5/235; G06F 17/10
[52] U.S. Cl. ...................... 348/207; 348/362; 348/71; 348/626; 348/581; 364/724.01; 364/724.16
[58] Field of Search ..................... 348/207, 362, 348/71, 626, 581; 364/724.01, 724.16

[56] References Cited

U.S. PATENT DOCUMENTS

| | | | |
|---|---|---|---|
| 4,651,308 | 3/1987 | Sato | 365/230 |
| 4,682,227 | 7/1987 | Heerah | 348/580 |
| 4,779,217 | 10/1988 | Takeda et al. | 364/724.16 |
| 4,903,132 | 2/1990 | Yamawaki | 358/209 |
| 5,016,107 | 5/1991 | Sasson et al. | 358/909 |

FOREIGN PATENT DOCUMENTS

| | | |
|---|---|---|
| 0068811 | 1/1983 | European Pat. Off. . |
| 0162501 | 11/1985 | European Pat. Off. . |
| 0368614 | 5/1990 | European Pat. Off. . |
| 2200012 | 7/1988 | United Kingdom . |

OTHER PUBLICATIONS

Applicant's submitted Prior Art (FIG. 1).
IEEE Transactions on Consumer Electronics, Aug. 1989, vol. 35, No. 3, p. 142, "MUSE/NISC Converter", M. Itoga, et al.

*Primary Examiner*—Wendy R. Greening
*Assistant Examiner*—Bipin Shalwala
*Attorney, Agent, or Firm*—Fitzpatrick, Cella, Harper & Scinto

[57] ABSTRACT

An electronic camera includes a memory circuit for storing a video signal representing at least a single image, a signal processing circuit for conducting digital processing in a vertical direction with a predetermined characteristic on the video signal read out from the memory circuit in the vertical direction and for conducting digital processing in a horizontal direction with another predetermined characteristic which is different from the predetermined characteristic on the video signal read out from the memory circuit in the horizontal direction, and a control circuit for switching over reading out of the video signal from the memory circuit between the vertical direction and the horizontal direction and for switching over the processing characteristic of the signal processing circuit between the predetermined characteristic and the another predetermined characteristic which is different from the predetermined characteristic.

28 Claims, 4 Drawing Sheets

ELECTRONIC CAMERA FEATURING SINGLE IMAGE PROCESSING

This application is a continuation of application Ser. No. 08/022,754 filed Feb. 19, 1993, which is a continuation of application Ser. No. 07/893,889 filed Jun. 4, 1992, which is a continuation of application Ser. No. 07/688,274 filed Apr. 22, 1991, all now abandoned.

BACKGROUND OF THE INVENTION

1. Field of the Invention

The present invention relates to an electronic camera of the type which has a digital memory.

2. Description of the Related Art

Due to developments in semiconductor memories occurring in recent years, electronic still cameras have been proposed which have a memory for temporarily storing a video signal representative of a single image (a single field or a single frame) obtained by an imaging device. (This signal being stored prior to recording on a disk or the like.) FIG. 1 shows such an electronic still camera.

In this electronic still camera, a light from an object passes through a plurality of optical lenses 1, 2, 3, and 4, a shutter mechanism 5, an infrared radiation cutting filter 6, an optical low-pass filter 7, and an on-chip color filter 8 and reaches the image forming surface of an imaging device 9 which converts the light into an electric signal, as shown in FIG. 1. The obtained video signal is read out to sample-hold circuits 10 separately as R (red), G (green), and B (blue) signals and sampled and held by the sample-hold circuits 10.

The outputs of the sample-hold circuits 10 are gain controlled by variable gain amplifiers 11-1 and 11-2 for controlling white balance and a variable gain amplifier 12 for adjusting the sensitivity, the outputs of the amplifiers 11-1, 12, and 11-2 being respectively supplied to A/D (analog-digital) converters 13-1, 13-2 and 13-3. The A/D converters 13-1, 13-2 and 13-3 have a clamping function and gamma correcting function. Therefore, in addition to A/D conversion, level clamping and gamma correction can also be conducted on the video signal supplied to the A/D converters.

The obtained digital video signal is converted into a switched Y (luminance) signal by a switch 14 which is switched over on a time sharing basis, and then temporarily stored in a normally-used FIFO type memory 15.

The individual components 9 to 14 are operated synchronously with a clock supplied from a clock generating circuit 16 controlled by a system controller 17. The clock generating circuit 16 suspends the supply of the clock signals to the individual components 9 to 14 when the video signal representing a single image has been stored in the memory 15, and thereby reduces power consumption.

The system controller 17 generates a white balance control signal and an iris control signal on the basis of the outputs of an automatic white balance (AWB) sensor 18 and of an automatic iris (AE) sensor 19. The system controller 17 also generates various types of control signals in accordance with the operation of an operation panel 20.

After the video signal representative of a single image has been stored in the memory 15, the stored video signal is read out from the memory 15. The read-out video signal is first supplied to a vertical aperture correcting circuit in sequence.

The vertical aperture correcting circuit includes two series-connected 1H line memories 21-1 and 21-2, and a normally used vertical finite impulse response (FIR) filter 22 composed of coefficient units and an adder. The vertical aperture correcting circuit conducts vertical aperture correction on the video signal supplied thereto. The video signal output from the vertical aperture correcting circuit is converted into an analog signal by a digital-analog (D/A) converter 23. The obtained analog signal passes through a low-pass filter 24 which removes the clock component of the signal, and then a clamping circuit (CL) 25 which clamps the signal to a predetermined level. The video signal further passes through a blanking circuit (BL) 26, then a sink adder 27 which adds a synchronizing signal to the video signal, and is then supplied to a recording/reproducing apparatus 28 which records the video signal on a recording medium, such as a magnetic disk.

The output (the switched Y signal) of the 1H line memory 21-1 of the vertical aperture correcting circuit is separated into color signals of R, G and B by a switch 30. The individual color signals pass through a plurality of horizontal FIR filters 31-1, 31-2 and 31-3, each including a plurality of delay circuits (latch circuits), a plurality of coefficient units and an adder, which limits the band thereof. The resultant color signals are converted into color difference signals by encoders 32 and 33. The obtained color difference signals are supplied to a switch 34 and converted into a line sequential color difference signal.

The resultant line sequential color difference signal is converted into an analog signal by a D/A converter 35. The obtained analog signal passes through a low-pass filter 36, a clamping circuit 37 and a blanking circuit 38 and is then supplied to the recording/reproducing apparatus 28.

The above-described individual components are driven synchronously with a clock supplied from the clock generating circuit 16.

In the thus-arranged electronic still camera, since the 1H line memories 21-1 and 21-2 are required for vertical aperture correction in addition to the memory 15, the scale of the circuit is increased, thus increasing production cost.

Furthermore, the aforementioned digital filters (horizontal FIR filters 31 and vertical FIR filter 22) are large in size and consume a large amount of power. These drawbacks make integration of the digital filters difficult.

SUMMARY OF THE INVENTION

In view of the aforementioned drawbacks associated with a conventional electronic still camera, an object of the present invention is to provide an electronic still camera which enables the circuit scale to be reduced.

The present invention in one aspect provides an electronic camera which comprises a memory means for storing a video signal representing at least a single image, a signal processing means for conducting digital processing in a vertical direction with a predetermined characteristic on the video signal read out from the memory means in the vertical direction and for conducting digital processing in a horizontal direction with another predetermined characteristic which is different from said predetermined characteristic on the video signal read out from the memory means in the horizontal direction, and a control means for switching over reading out of the video signal from the memory means, between in the vertical direction and the horizontal direction and for switching over the processing characteristic of the signal processing means between the predetermined characteristic and another predetermined characteristic which is different from the first predetermined characteristic.

The present invention in another aspect pertains to an electronic still camera comprising a memory means for storing a video signal representative of at least a single image, the memory means allowing for write-in and read-out operations of the video signal in both horizontal and vertical directions, a signal processing means for conducting a predetermined signal processing on the video signal output from the memory means, and a control means for changing the signal processing conducted by the signal processing means depending on whether the signal is read out from the memory means in the horizontal or vertical directions.

The present invention in yet another aspect pertains to an electronic still camera comprising an imaging means for producing a video signal by conducting photoelectric conversion on a light from an object, a memory means for storing the video signal obtained by the imaging means, and a signal processing means for conducting a predetermined signal processing on the signal read out from the memory means, the signal processing means changing its processing operations depending on how the signal is read out from said memory means.

The present invention in still a further aspect pertains to a signal processing circuit comprising a signal storage means, a control means for reading out a signal from the signal storage means in a predetermined read-out order, and a signal processing means for conducting a signal processing corresponding to the read-out order on the signal read out from the signal storage means.

Other objects and advantages of the invention will become apparent during the following discussion of the accompanying drawings.

DETAILED DESCRIPTION OF THE PREFERRED EMBODIMENTS

Figure 1:
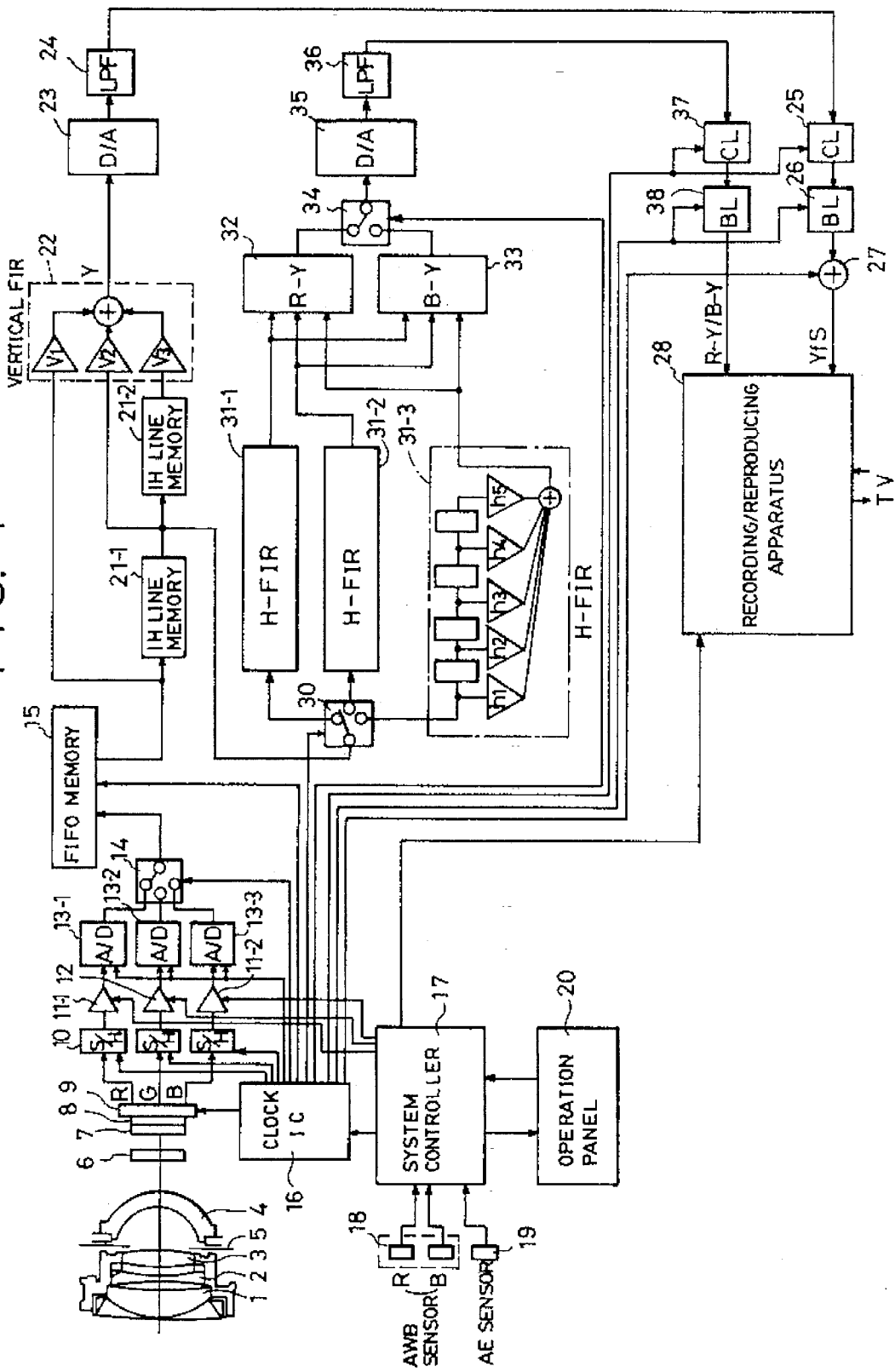
FIG. 1 is a block diagram of a conventional electronic still camera.
Figure 2:
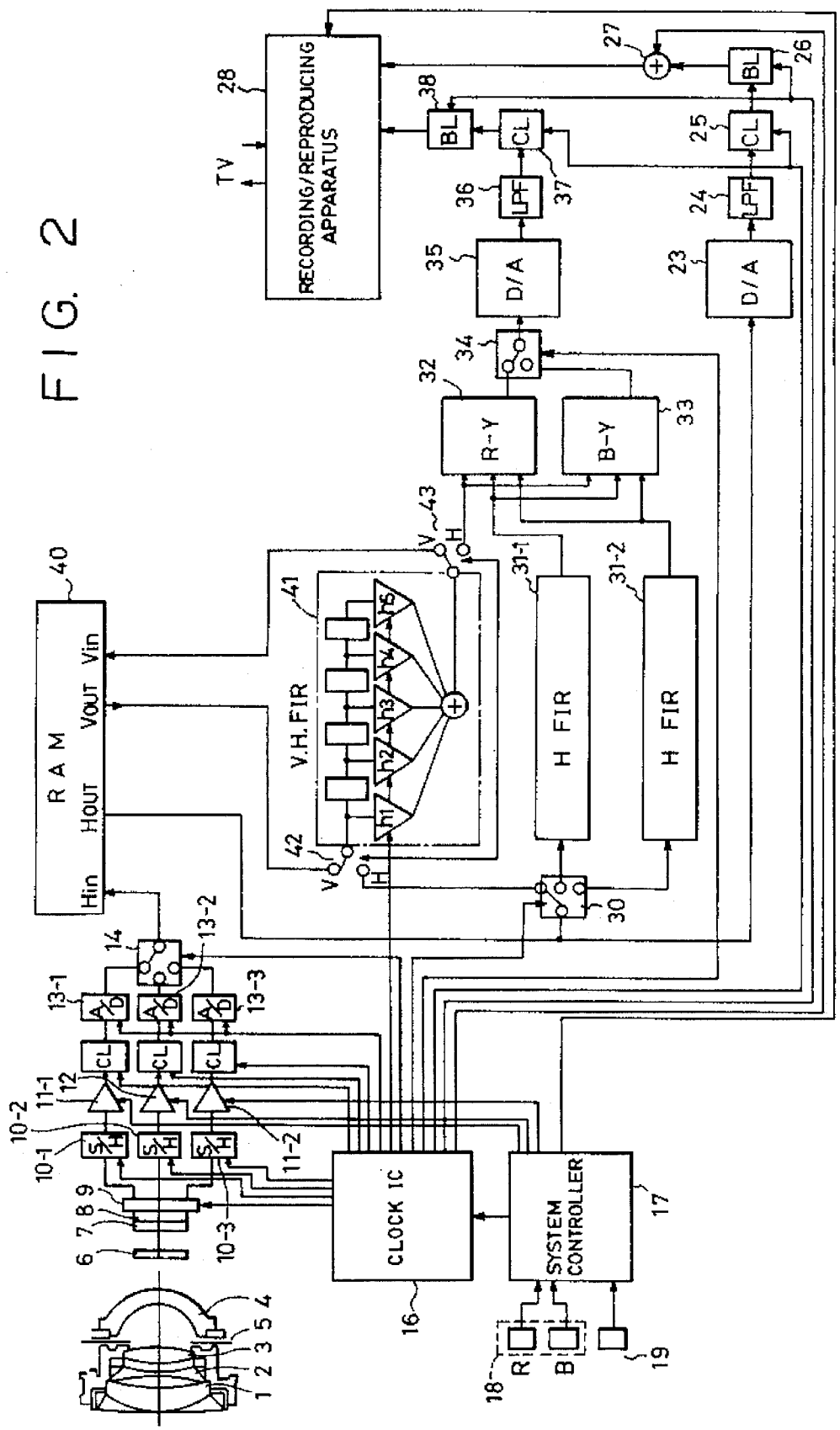
FIG. 2 is a block diagram of a first embodiment of an electronic still camera according to the present invention.
Figure 3:
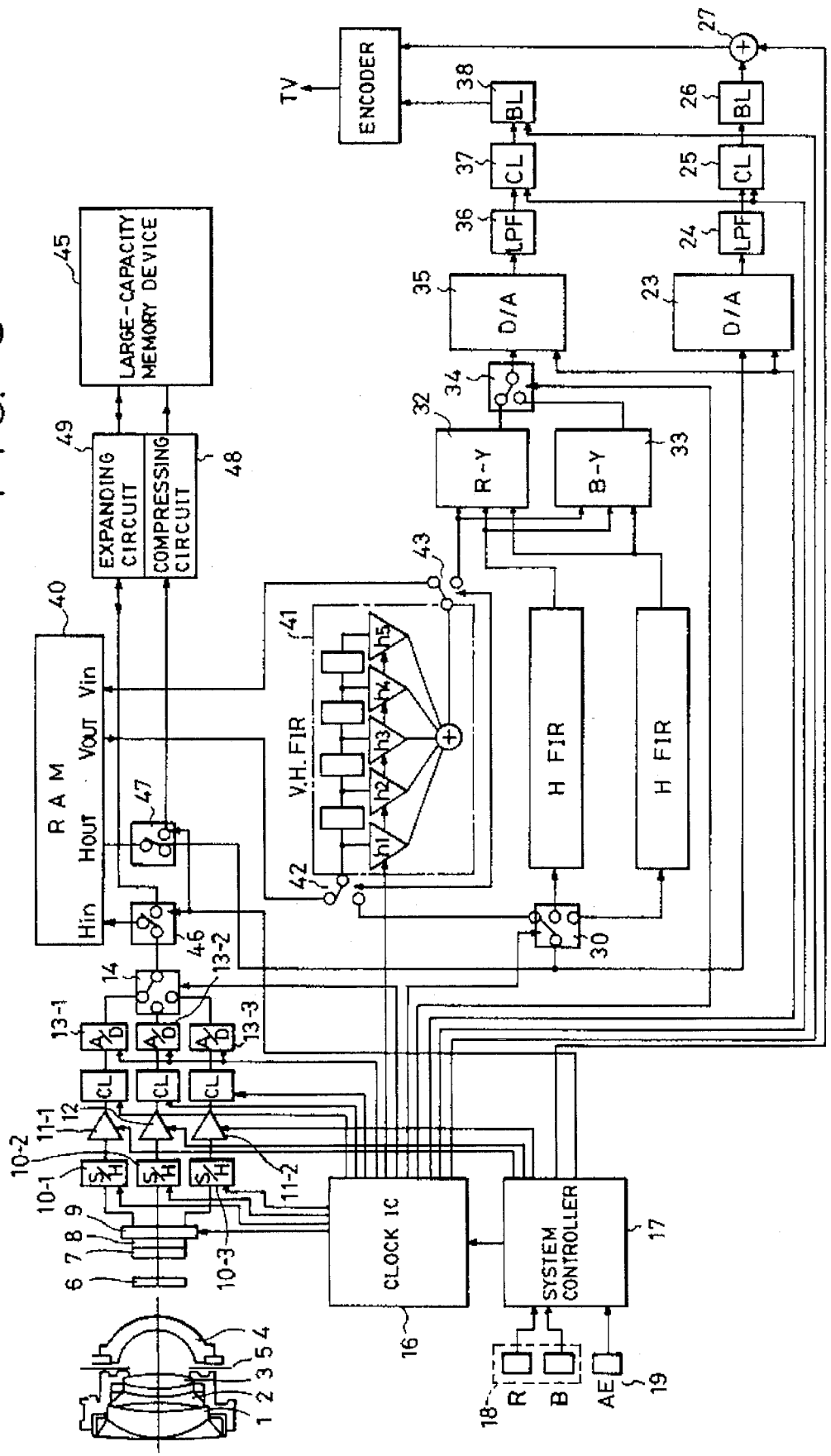
FIG. 3 is a block diagram of a second embodiment of the electronic still camera according to the present invention.

Preferred embodiments of an electronic still camera according to the present invention will now be described with reference to FIGS. 2 to 4. In the discussion of the following embodiments, the same reference characters are used to denote components which are the same as those in the conventional camera, description thereof being omitted.

In a first embodiment, a memory 40, such as a RAM, is used as the memory for temporarily storing a video signal representative of a single image. Consequently, the video signal can be written in both the horizontal and vertical scanning directions, and the sequentially written video signal can be read out in both horizontal and vertical scanning directions. That is, in the present invention, a video signal can be sequentially written in a horizontal scanning direction in the horizontal write mode, and the video signal can be read out in the horizontal scanning direction in the horizontal read-out mode by designating an address by means of an address designating circuit in the memory which is controlled by the system controller 17. Also, the video signal can be sequentially written in the vertical scanning direction in the vertical write mode, and the video signal can be sequentially read out in the vertical scanning direction in the vertical read-out mode.

The coefficients of coefficient units h1 to h5 which constitute a V.H. single FIR filter 41 can be varied between values respectively corresponding to the vertical and horizontal filters.

The input and output of the FIR filter 41 are respectively switched over by H/V switches 42 and 43 synchronously with the switch-over between the vertical and horizontal modes.

The above-described individual operation modes are controlled by the system controller 17, which may be in the from of a microcomputer.

In the electronic still camera having the above-described configuration, the memory 40 is in the horizontal write mode when the operation of the still camera is started, and the output from the switch 14 is thereby sequentially written in the memory in the horizontal scanning direction.

When the video signal representative of the single image has been written in the memory 40, the memory 40 is set in the vertical read-out mode, and the written video signal is thus sequentially read out in the vertical scanning direction.

The read-out video signal is supplied to the FIR filter 41 through the H/V switch 42. At that time, predetermined values are set in the FIR filter 41, as mentioned above, and the FIR filter 41 functions as the vertical aperture correcting circuit.

The video signal on which vertical aperture correction has been conducted is supplied again to the memory 40 through the H/V switch 43 and written in the memory which is in the vertical write mode.

Switch-over between the read-out mode and the write mode is conducted during the aperture correction operation each time the FIR filter 41 completes aperture correction on one pixel in the vertical direction. Hence, the cyclic operation, consisting of read-out from the memory 40, aperture correction, and write-in into the memory 40, is repetitively conducted for each pixel.

When aperture correction on the video signal has been completed, the memory 40 is set in the horizontal read-out mode, and the FIR filter 41 is switched over to the horizontal read-out mode. At the same time, the H/V switches 42 and 43 are switched over to the H side. Consequently, the video signal read-out from the memory 40 is supplied to the D/A converter 23 in the form of the switched Y signal, as in the case of the aforementioned conventional still camera. At the same time, the read-out video signal is separated into color signals of R, G and B by the switch 30 and then supplied to the FIR filters 41, 31-1, and 31-2.

As stated above, in the present embodiment, the memory 40 is constructed such that a video signal can be written in and read out in both the horizontal and vertical directions, and the coefficients of the coefficient units of the single V.H. FIR filter 41 can be varied in accordance with the operation mode. Consequently, the line memories and the vertical FIR filter, required for vertical aperture correction in the conventional still camera, can be eliminated.

As a result, the scale of the circuit can be reduced. This enables circuit integration and a decrease in production cost.

In the aforementioned embodiment, the recording/reproducing apparatus 28 of the type which incorporates a magnetic disk is used. However, a large-capacity solid memory 45, such as that shown in FIG. 3, may also be used.

That is, in the second embodiment, a large-capacity memory device 45 for recording the video signal on which vertical aperture correction has been performed is used in place of the recording/reproducing apparatus 28 of the first embodiment. Furthermore, the input and output lines of the memory 40 in the horizontal scanning mode are switched over by switches 46 and 47.

In this embodiment, the video signal (the output of the imaging device) written in the memory 40 in the horizontal write mode is read out in the vertical read-out mode, the aforementioned vertical aperture correction is conducted on the read-out signal, and the resultant video signal is written again in the memory 40 in the vertical write mode. Thereafter, the video signal is read-out in the horizontal read-out mode and supplied to a compressing circuit 48 through the switch 47. The compressed video signal is stored in the large-capacity memory device 45.

The video signal read-out from the large-capacity memory device 45 is expanded by an expansion circuit 49, and then supplied, through the switch 46, the memory 40 and switch 30, to the horizontal FIR filters 41 and 31 which limit the band of the signal.

The aforementioned embodiments use a RAM as the memory 40. However, the memory 40 may also be a FIFO type memory which allows for writing in and reading-out of data in both the horizontal and vertical directions.

Figure 4:
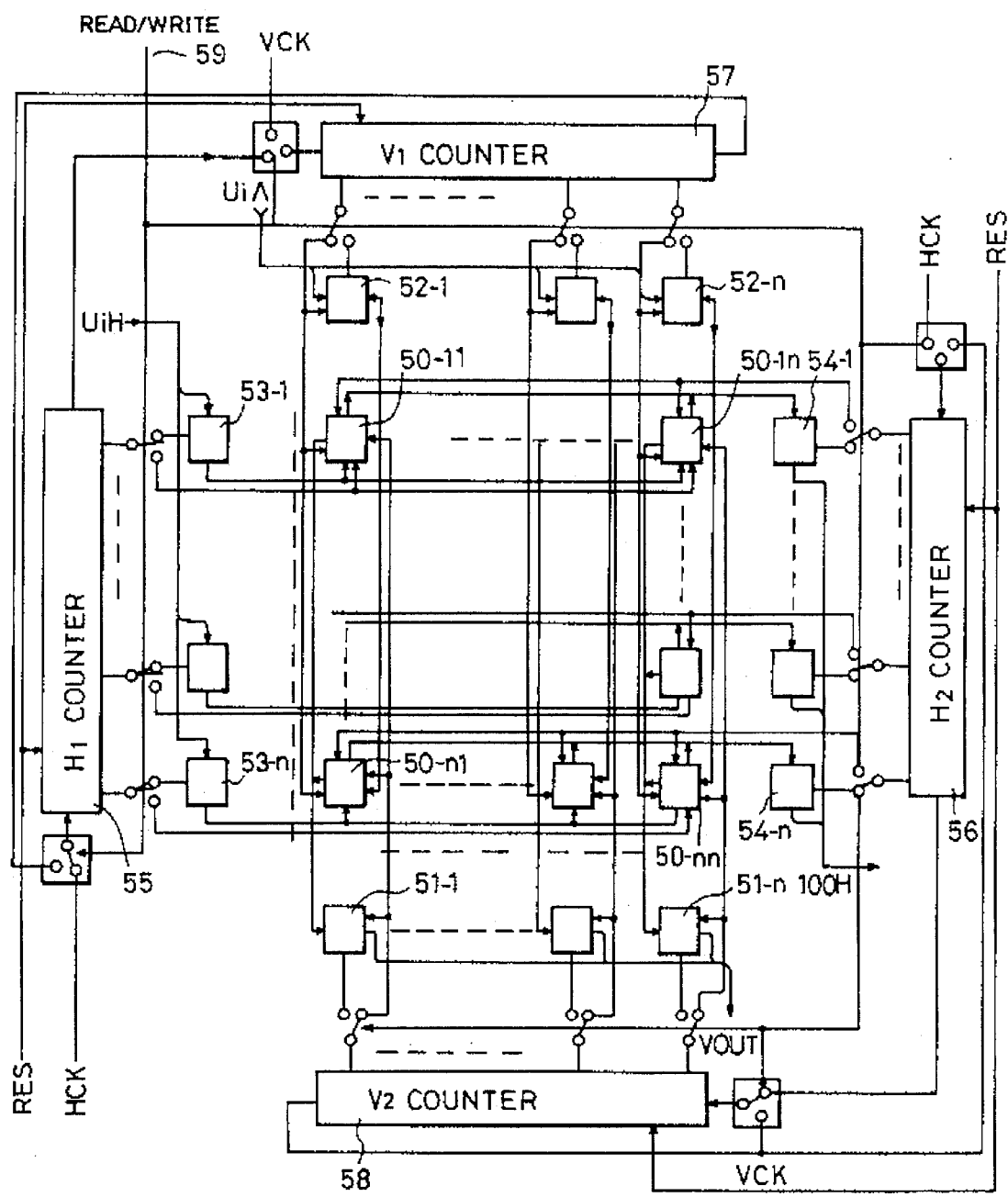
FIG. 4 is a circuit diagram of a memory used in the present invention.

That is, the FIFO type memory has a configuration shown in FIG. 4. In FIG. 4, reference numerals 50-11 to 50-nn, 51-1 to 51-n, 52-1 to 52-n, 53-1 to 53-n and 54-1 and 54-n denote basic cells which are the constituents of the memory. A pair of data output lines, a pair of data input lines, a write select and a read select are respectively connected to each basic cell for control of its operation.

Reference numerals 55 and 56 denote Johnson counters for conducting designation of an address in the horizontal direction. In a case where the number of bits in the horizontal direction is 910, the number of bits of the Johnson counter 55 or 56 is 910 bits. Reference numerals 57 and 58 denote Johnson counters for conducting designation of an address in the vertical direction. The number of bits in the vertical direction is 263 bits in a case where a television signal conforming to the NTSC standard is handled. A reference numeral 59 denotes a terminal to which a mode control signal for designating in/out in the horizontal direction and in/out in the vertical direction is supplied. Read/write operations in the horizontal and vertical directions are designated by this mode control signal.

The basic operation of the thus-arranged memory will be described below. Write-in and read-out operations in the horizontal mode are known, and a detailed description thereof has been omitted.

In the vertical mode, a clock is input to clock input terminals VCK. The V counters 57 and 58 are driven by this clock. Each time the V counters 57 and 58 complete counting for one column, the H counters 55 and 56 are incremented. That is, the V counters 57 and 58 drive the line memory in the vertical direction, and the H counters 55 and 56 drive the basic cells.

Transfer of data in the write-in and read-out modes is conducted in the following manner: first, data is transferred in sequence to the basic cells which constitute the line memory in the vertical direction. Next, the data is transferred to the adjacent basic cells in the horizontal direction by a carry carried out by the V counters 57 and 58.

In this memory, write-in and read-out in the vertical direction are conducted by transferring the data representing one column in the vertical direction in the horizontal direction each time the data representing one column in the vertical direction has been written in or read-out.

In this embodiment, a buffer line memory having a capacity equivalent to one column in the vertical direction is provided. It is therefore possible to read out data from the one vertical line memory during, for example, the aperture correction operation and at the same time to store the video signal on which aperture correction has been conducted in the buffer line memory.

As will be understood from the foregoing description, in the present invention, the memory is constructed such that data can be written in and read-out from the memory in both horizontal and vertical directions. Furthermore, the characteristics of the signal processing means can be varied in accordance with the operation mode. In consequence, the line memories and vertical FIR filter, required in the conventional electronic still camera, can be eliminated.

As a result, the scale of the circuit can be reduced. This enables circuit integration and a decrease in production cost.

Furthermore, in the present invention, the single signal processing means is time-shared for both vertical and horizontal processings. This also allows the scale of the circuit to be reduced.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electronic camera comprising:

memory means for storing a video signal representative of at least a single image, said memory means allowing read-out operations of the video signal selectively in one of a horizontal direction and a vertical direction;

a filter, having variable frequency characteristics, that can be controlled to have different variable frequency characteristics for data read out from said memory means both in a vertical direction and in a horizontal direction, for filtering an output video signal of said memory means; and control means for changing the variable frequency characteristics of said filter in accordance with whether the signal is read out from said memory means in a horizontal direction or a vertical direction, so that said filter has first frequency characteristics when the signal is read out in a horizontal direction and said filter has different frequency characteristics when the signal is read out in a vertical direction.

2. The electronic camera according to claim 1, wherein said memory means comprises an X-Y addressing-type memory.

3. The electronic camera according to claim 2, wherein said X-Y addressing-type memory comprises a RAM.

4. The electronic camera according to claim 2, wherein said X-Y addressing-type memory comprises a FIFO memory which allows for write-in and read-out operations of data in both horizontal and vertical directions.

5. The electronic camera according to claim 4, wherein said FIFO memory comprises a plurality of basic cells arranged in columns and rows, each of said basic cells having two data output lines and two data input lines connected thereto.

6. The electronic camera according to claim 1, wherein said filter unit comprises a plurality of series-connected delaying elements, a single adder, and a plurality of coefficient units respectively connected between said individual delaying elements and said adder, a coefficient of each of said coefficient units which is set in the processing in the vertical direction being different from that set in the processing in the horizontal direction.

7. The electronic still camera according to claim 1, wherein said signal processing unit includes a digital signal processing means.

8. The electronic camera according to claim 1, wherein the filtering in the vertical direction in said filter unit includes a digit vertical aperture correction.

9. An electronic camera comprising:

image means for producing a video signal by conducting photoelectric conversion on a light from an object;

memory means for storing the video signal obtained by said imaging means, wherein the video signal is selectively read out from said memory means in one of a plurality of directions;

a filter, having variable frequency characteristics, that can be controlled to have different variable frequency characteristics for data read out from said memory means in each of the plurality of directions, for filtering the video signal read out from said memory means; and control means for controlling the variable frequency characteristics of said filter in accordance with the direction in which the video signal is read out from said memory means, so that said filter has first frequency characteristics when the signal is read out in one of the plurality of directions and said filter has different frequency characteristics when the signal is read out in another of the plurality of directions.

10. The electronic camera according to claim 9, wherein said memory means comprises an X-Y addressing-type memory which allows for write-in and read-out operations of a signal in both horizontal and vertical directions.

11. The electronic camera according to claim 9, wherein said variable frequency characteristics of said filter unit is changed depending on whether the video signal is read out from said memory means in a horizontal direction or a vertical direction.

12. The electronic camera according to claim 9, wherein said filter unit comprises a plurality of series-connected delaying elements, a single adder, and a plurality of coefficient units respectively connected between said individual delaying elements and said adder, a coefficient of each of said coefficient units which is set in the processing in the vertical direction being different from that set in the processing in the horizontal direction.

13. A signal processing circuit comprising:

signal storage means;

control means for reading out a signal from said signal storage means selectively in one of a plurality of different read-out orders; and a filter, having a frequency characteristic that is variable, and that can be controlled to have a different variable frequency characteristic in accordance with each of the plurality of different read-out orders, for filtering the signal read out from said signal storage means, wherein, said filter has first frequency characteristics when the signal is read out in one of the plurality of different read-out orders and said filter has different frequency characteristics when the signal is read out in another of the plurality of different read-out orders.

14. The signal processing circuit according to claim 13, wherein said control means writes the output of said filter unit again in said signal storage means so that a plurality of different signal filtering can be conducted on the signal stored in said signal storage means on a time-sharing basis.

15. The signal processing circuit according to claim 13, wherein said signal storage means comprises an X-Y addressing-type memory.

16. The signal processing circuit according to claim 13, wherein said filter unit comprises a plurality of series-connected delaying elements, a single adder, and a plurality of coefficient units respectively connected between said individual delaying elements and said adder, a coefficient of each of said coefficient units which is set in the processing in the vertical direction being different from that set in the processing in the horizontal direction.

17. The signal processing circuit according to claim 13, wherein said control means comprises a microcomputer.

18. A filter apparatus comprising:

input means for inputting a signal;

a plurality of serially-connected delay units, having output terminals, connected to said input means for serially delaying the signal input by said input means;

a plurality of coefficient units, having respective coefficients, connected to respective ones of said output terminals of said plurality of serially-connected delay units, that can be controlled to have different respective variable coefficients in accordance with a data order that is characteristic of the signal, for multiplying respective output signals of said plurality of delay units by the respective coefficients of said plurality of coefficient units; and control means for varying the respective coefficients of said plurality of coefficient units in accordance with the data order characteristic of the signal, so that said coefficient units have first coefficients when the signal has a first data order characteristic and said coefficient units have different coefficients when the signal has a second data order characteristic.

19. A filter apparatus according to claim 18, further comprising operation means for performing an operation on the output signals of said plurality of coefficient units.

20. A filter apparatus according to claim 19, wherein said operation means comprises an adding circuit.

21. A filter apparatus according to claim 18, further comprising a signal source for supplying an image signal to said input means.

22. A filter apparatus according to claim 21, wherein said signal source supplies the image signal selectively in one of a plurality of different orders.

23. A filter apparatus according to claim 22, wherein said signal source comprises memory means.

24. A filter apparatus according to claim 22, wherein said signal source supplies the image signal selectively corresponding to a vertical direction and to a horizontal direction.

25. A filter apparatus comprising:

an image signal source for supplying an image signal selectively in one of a plurality of different orders;

a filter, that can be controlled to have a different variable frequency characteristic for data supplied in each of the plurality of different orders, for filtering the image signal; and control means for controlling the frequency characteristic of said filter in accordance with the order in which the image signal is supplied by said image signal source, so that said filter has a first frequency characteristic when the signal is in a first order and said filter has a different frequency characteristic when the signal is in another order.

26. A filter apparatus according to claim 25, wherein said image signal source comprises memory means.

27. A filter apparatus according to claim 26, wherein said image signal source supplies the image signal selectively in a vertical direction and in a horizontal direction.

28. A filter apparatus according to claim 25, wherein said filter unit comprises a finite impulse response filter.

* * * * *

UNITED STATES PATENT AND TRADEMARK OFFICE
CERTIFICATE OF CORRECTION

PATENT NO. : 5,543,835
DATED : August 6, 1996
INVENTOR(S) : Toshihiko Mimura

It is certified that error appears in the above-indentified patent and that said Letters Patent is hereby corrected as shown below:

ON THE COVER PAGE:

Under item [75] "Inventor":

"Toshihiko Mumura," should read --Toshihiko Mimura--.

IN THE DISCLOSURE:

COLUMN 2:

Line 63, "between in the" should read --between the--.

COLUMN 4:

Line 14, "from" should read --form--.

COLUMN 5:

Line 29, "and" (second occurrence) should read --to--.

UNITED STATES PATENT AND TRADEMARK OFFICE
CERTIFICATE OF CORRECTION

PATENT NO. : 5,543,835
DATED : August 6, 1996
INVENTOR(S) : Toshihiko Mimura

It is certified that error appears in the above-indentified patent and that said Letters Patent is hereby corrected as shown below:

<u>COLUMN 7</u>:

Line 11, "signal processing unit includes" should read --filter unit comprises--; and
Line 42, "is" should read --are--.

Signed and Sealed this

Eleventh Day of March, 1997

*Attest:*

BRUCE LEHMAN

*Attesting Officer*     *Commissioner of Patents and Trademarks*